United States Patent
Ido

(10) Patent No.: US 9,218,552 B2
(45) Date of Patent: Dec. 22, 2015

(54) IMAGE PROCESSING APPARATUS AND IMAGE PROCESSING METHOD

(71) Applicant: CANON KABUSHIKI KAISHA, Tokyo (JP)

(72) Inventor: Yoko Ido, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/290,174

(22) Filed: May 29, 2014

(65) Prior Publication Data

US 2014/0368885 A1 Dec. 18, 2014

(30) Foreign Application Priority Data

Jun. 14, 2013 (JP) .................................. 2013-126123

(51) Int. Cl.
| | |
|---|---|
| *G06K 15/00* | (2006.01) |
| *H04N 1/40* | (2006.01) |
| *G06K 15/02* | (2006.01) |
| *H04N 1/407* | (2006.01) |
| *G03G 15/00* | (2006.01) |
| *G06K 9/00* | (2006.01) |

(52) U.S. Cl.
CPC .............. *G06K 15/188* (2013.01); *G03G 15/00* (2013.01); *H04N 1/4072* (2013.01); *G06K 9/00456* (2013.01); *H04N 1/407* (2013.01); *H04N 1/4074* (2013.01)

(58) Field of Classification Search
USPC ..................................... 358/1.9, 2.1, 518–522
See application file for complete search history.

(56) References Cited

U.S. PATENT DOCUMENTS

| 7,828,405 | B2 * | 11/2010 | Tsuchiya et al. ................. 347/19 |
| 8,379,279 | B2 | 2/2013 | Ido |
| 2002/0089514 | A1 * | 7/2002 | Kitahara et al. ............... 345/600 |
| 2004/0046974 | A1 * | 3/2004 | Takura ........................... 358/1.2 |
| 2004/0104952 | A1 * | 6/2004 | Tsuchiya et al. ................. 347/15 |
| 2005/0078867 | A1 * | 4/2005 | Kanno .......................... 382/163 |
| 2005/0280852 | A1 * | 12/2005 | Namizuka ...................... 358/1.9 |
| 2006/0007465 | A1 * | 1/2006 | Hayashi ....................... 358/1.13 |
| 2006/0203267 | A1 * | 9/2006 | Hirayama ....................... 358/1.9 |
| 2006/0203290 | A1 * | 9/2006 | Ito .................................. 358/3.1 |
| 2008/0018937 | A1 * | 1/2008 | Kimakura ...................... 358/3.1 |
| 2013/0258412 | A1 * | 10/2013 | Otsuka ........................ 358/3.01 |

FOREIGN PATENT DOCUMENTS

| JP | 07-221986 A | 8/1995 |
| JP | 2002325179 A | * 11/2002 |

OTHER PUBLICATIONS

JPO Machine Translation of JP2002-325179 listed above.*

* cited by examiner

*Primary Examiner* — Richard Zhu
(74) *Attorney, Agent, or Firm* — Fitzpatrick, Cella, Harper & Scinto

(57) ABSTRACT

An output density range is divided such that, after gradation targets have been applied, adjusted density ranges for output are uniform across all objects. Furthermore, through reverse calculation using the gradation targets that are set in one-to-one correspondence with the objects, adjusted density ranges of the respective objects are set independently.

13 Claims, 12 Drawing Sheets

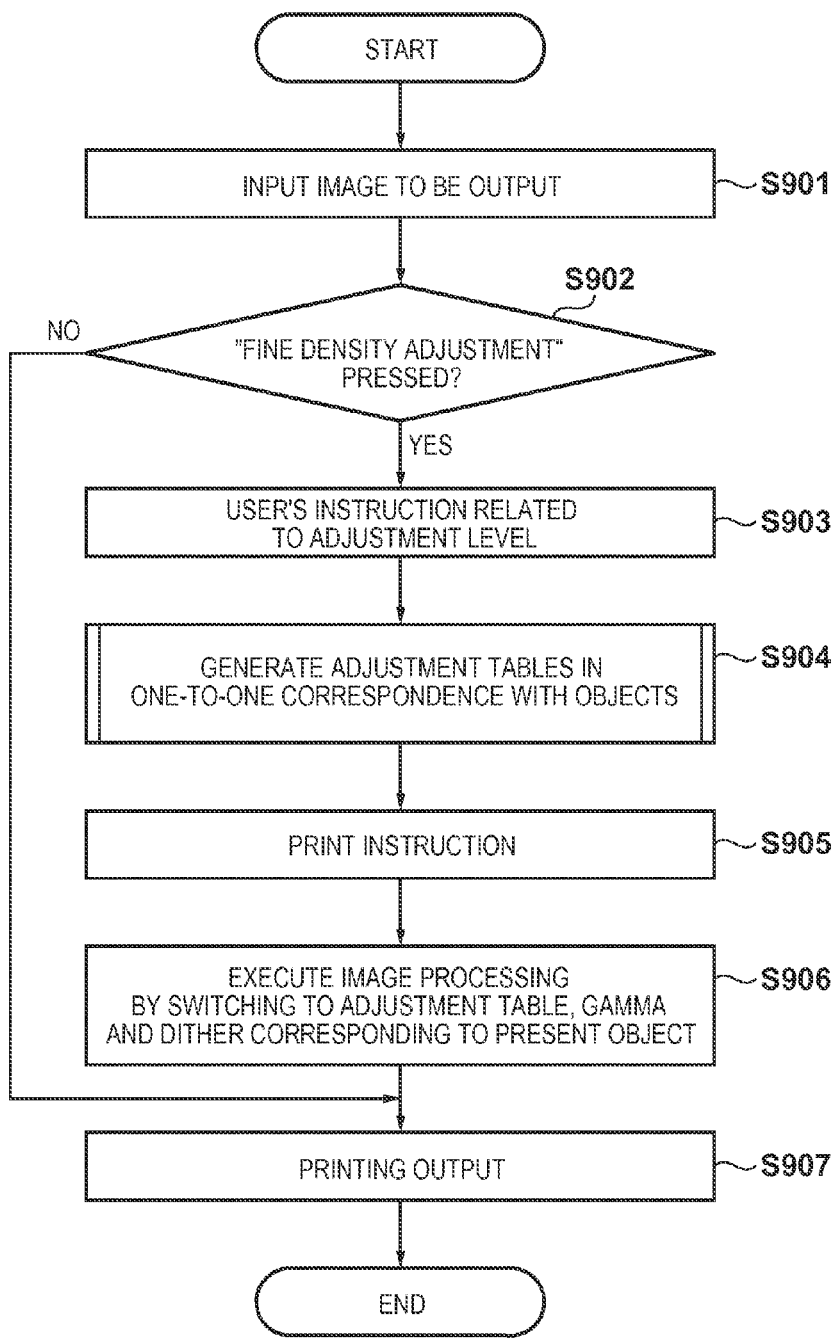

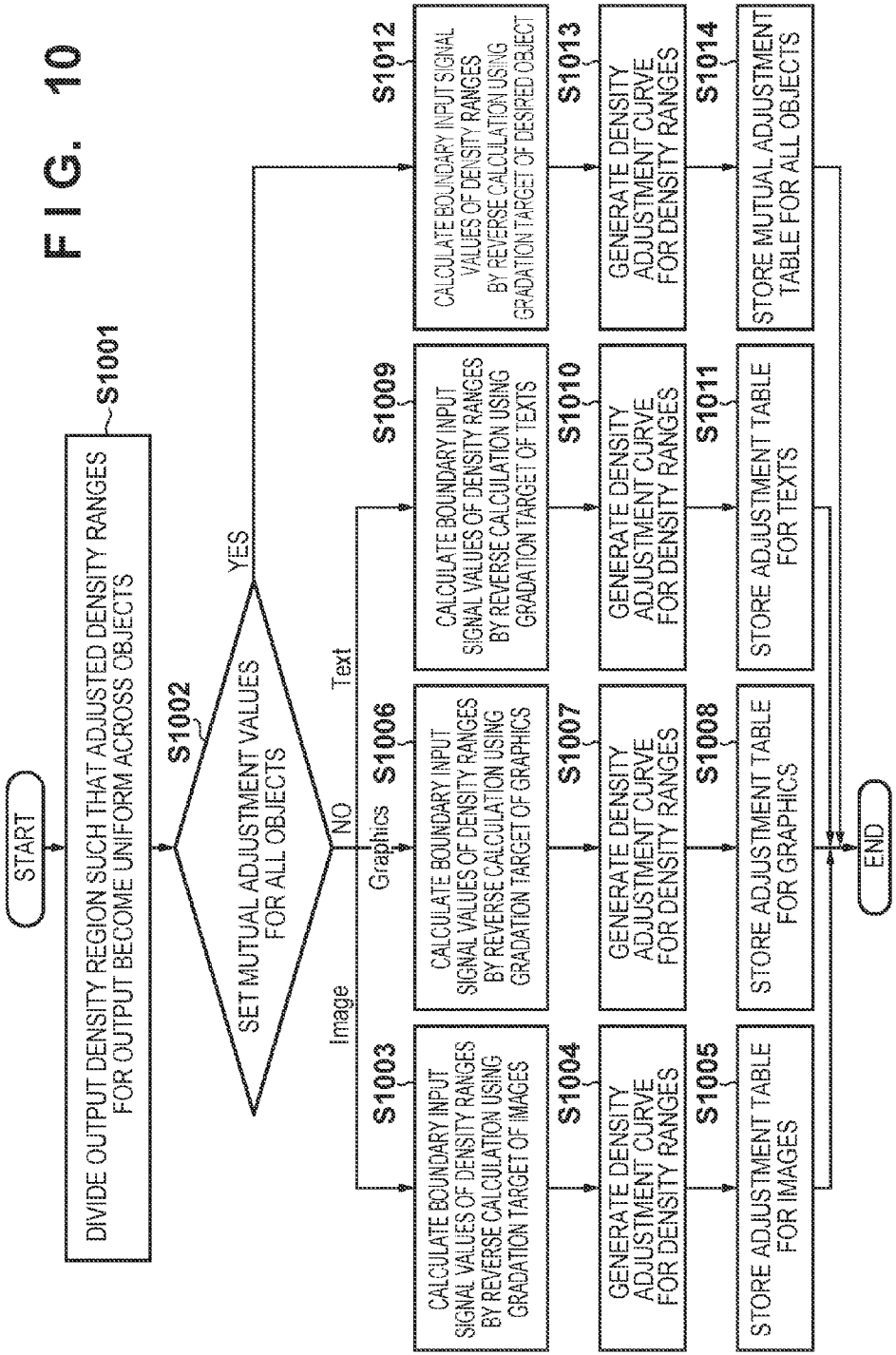

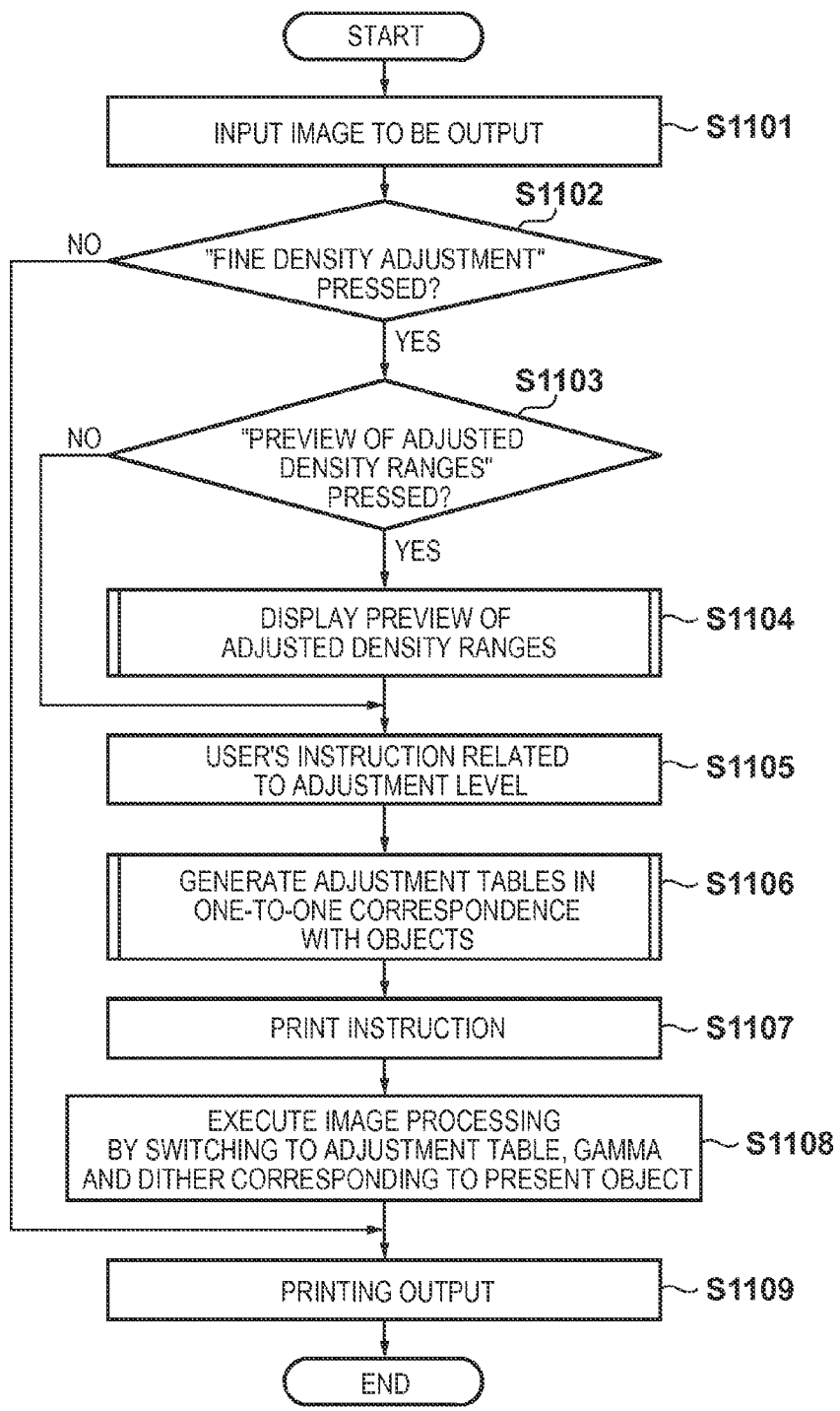

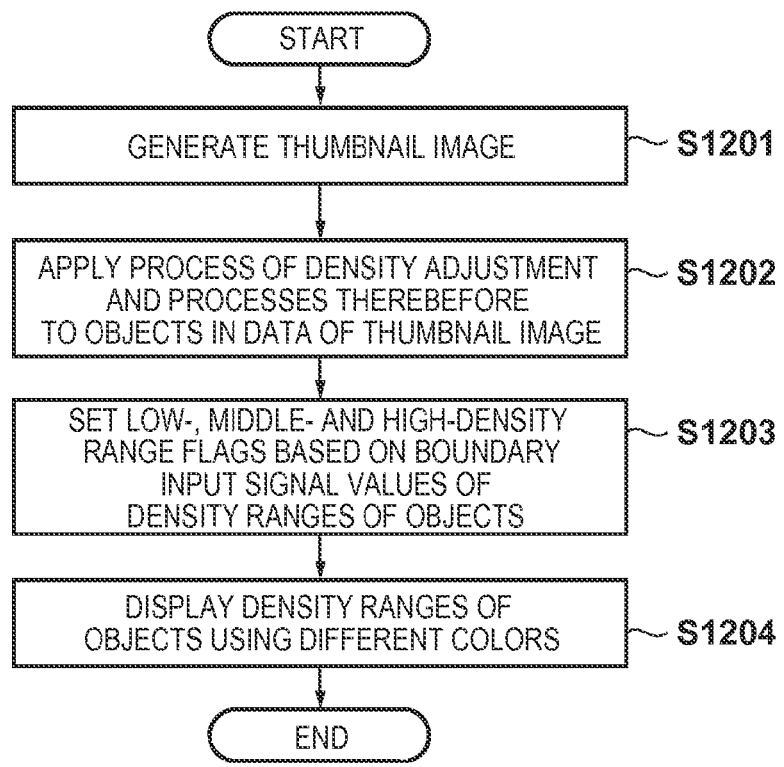

IMAGE PROCESSING APPARATUS AND IMAGE PROCESSING METHOD

BACKGROUND OF THE INVENTION

1. Field of the Invention

The present invention relates to an image processing apparatus and an image processing method that have a density adjustment function.

2. Description of the Related Art

In order to realize preferable gradation reproduction, some image processing apparatuses such as electrophotographic printers apply different gradation targets to objects such as images, graphics and texts. A gradation target refers to target gradation properties of an image; a gradation target mentioned herein represents a function and a correction table for correcting an output image signal so as to coordinate an output image signal value with target density at which an image is formed in correspondence with the signal value. For example, a gradation target with a concave curve (that is to say, conversion for increasing intermediate density) is applied to texts for increased readability, and a gradation target with a convex curve (that is to say, conversion for reducing intermediate density) is applied to images for gradation properties.

Also, some electrophotographic printers have a function of adjusting toner density characteristics for the case where actual density characteristics have deviated from ideal density characteristics due to temporal changes and durability, and for the case where a user wishes to switch to desired density characteristics. A density adjustment function of a printer may automatically coordinate density with a gradation target that has been determined in advance, or adjust density through manual operation. In the case of density adjustment through manual operation, an inclination of a density characteristic for each of cyan, magenta, yellow and black (hereinafter noted as C, M, Y and K, respectively) is changed, or an entire density range of each of C, M, Y and K is divided into low-, middle- and high-density ranges so as to enable independent level adjustment on a per-density range basis (for example, Japanese Patent Laid-Open No. 07-221986). For example, a technique of Japanese Patent Laid-Open No. 07-221986 is advantageous in that, as density can be finely adjusted on a per-color basis and on a per-density range basis, a user can adjust coloration with high flexibility (hereinafter referred to as a "density fine adjustment" function). A printer that applies different gradation targets to different objects, as has been described above, conducts printing by applying density conversion of the density adjustment function to image data, and further applying gradation targets, screens, and the like for the respective objects to the result of the adjustment.

However, a problem with the foregoing case where different gradation targets are applied to different objects is that the density fine adjustment function uses different density adjustment regions for different objects. In other words, there are cases where appropriate adjustment is made for one object while unintended adjustment is made for another object.

Density fine adjustment will now be described with reference to FIG. 6. It should be noted that, for the sake of simplicity, the following description focuses on density fine adjustment for K only. It will be assumed that gradation targets 603, 604 and 605 are applied to images, graphics and text objects, respectively (a linear line 610 is drawn for comparison). If density fine adjustment is not performed, the gradation targets 603, 604 and 605 serve as output density characteristics as-is. Here, an output density range is trisected as indicated by output density 611 such that the output density ranges look uniform if the density fine adjustment is performed, and based on reverse calculation using the gradation target 603, input density ranges corresponding to the output density ranges are considered as adjusted density ranges. In the present example, output density characteristics obtained when the gradation target 603 for images is used are trisected so as to set mutual adjusted density ranges of the density fine adjustment for all objects. That is to say, an input low-density range of the density fine adjustment that has been set based on an output low-density range for images is a low-density range 609. The adjustment is performed by using this low-density range 609 mutually for graphics and text objects. If an adjustment value of −8 is set for the low-density range via a UI 601 for the density fine adjustment, an adjustment table 602 corresponding to the adjustment value (−8) for the low-density range 609 is internally generated. By synthesizing this adjustment table 602 and the gradation targets of respective object types, output density characteristics 606, 607 and 608 are obtained for images, graphics and texts, respectively. With regard to images, the low-density range in the final output density matches the density range adjusted by the density fine adjustment. However, with regard to graphics, the adjustment is performed further on the middle-density range in the final output density, and with regard to texts, the adjustment is performed further on the high-density range in the final output density. In other words, even though the user has intended to lighten only a low-density object, an object of middle or higher density also looks lighter with regard to graphics and texts.

SUMMARY OF THE INVENTION

The present invention has been made in view of the above problems, and provides an image processing apparatus and an image processing method that can appropriately perform cross-object density adjustment, even with respect to image data including a mixture of objects for which different gradation targets are applied.

According to one aspect of the present invention, there is provided an image processing apparatus that obtains output image data by processing input image data, comprising: a density adjustment unit capable of adjusting density of a plurality of predetermined density ranges in the output image data independently on a per-density range basis; a gradation conversion unit that applies gradation conversion of different gradation characteristics for different types of objects included in the image data; a calculation unit that calculates density ranges in the input image data on a per-object type basis by converting the density ranges in the output image data, which are adjusted by the density adjustment unit, using reverse conversion of the gradation conversion that is applied on a per-object type basis, and by further converting a result of the conversion using reverse conversion of density conversion applied by the density adjustment unit; and a generation unit that generates adjustment tables in one-to-one correspondence with the types of objects, the adjustment tables corresponding to amounts of adjustment performed by the density adjustment unit with respect to the density ranges for density of the input image data, which have been calculated by the calculation unit, wherein the density adjustment unit adjusts density of the input image data using the adjustment tables generated by the generation unit, and the gradation conversion unit derives the output image data by applying gradation conversion to the image data whose density has been adjusted by the density adjustment unit.

According to another aspect of the present invention, there is provided an image processing apparatus, comprising: an adjustment unit that adjusts a density of each of a plurality of density ranges independently of other density ranges for each type of objects included in input image data; a correction unit that corrects the input image data using different gradation characteristics for different types of objects and a result of adjustment by the adjustment unit, wherein a range of a low-density range in the plurality of density ranges of a type of object is narrower than that of another type of object, the type of object having a gradation characteristic that a ratio of an output range to an input range in the low-density range is larger than the ratio for the other type of object.

The present invention enables an image processing apparatus that has a function of adjusting density on a per-density range basis to perform density adjustment for a selected density range, even with respect to image data including a mixture of objects for which different gradation targets are applied.

Further features of the present invention will become apparent from the following description of exemplary embodiments with reference to the attached drawings.

BRIEF DESCRIPTION OF THE DRAWINGS

FIG. 9 is a flowchart showing a main processing flow according to a first embodiment.

FIG. 10 is a flowchart showing processing for generating adjustment tables according to the first embodiment.

FIG. 11 is a flowchart showing a main processing flow according to a second embodiment.

FIG. 12 is a flowchart showing processing for displaying a preview of adjusted density ranges according to the second embodiment.

DESCRIPTION OF THE EMBODIMENTS

The following describes the best mode for carrying out the present invention with reference to the drawings.

First Embodiment

Figure 1:
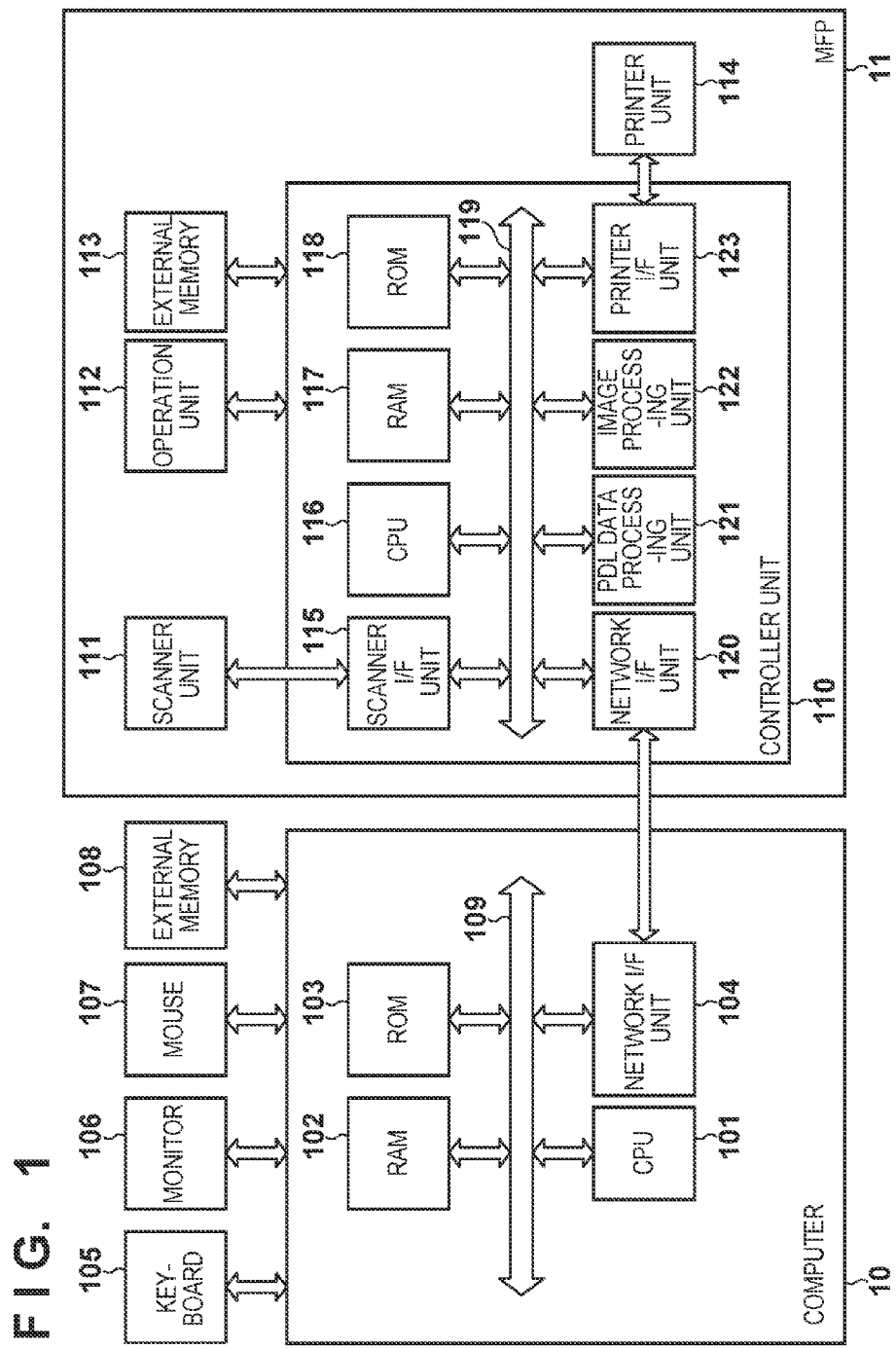
FIG. 1 is a configuration diagram of a system according to one embodiment of the present invention, including a computer and an MFP.

FIG. 1 is an explanatory block diagram showing a configuration of a printer control system including a computer according to the present embodiment. It should be naturally appreciated that the present invention is applicable to both a single apparatus and a system made up of a plurality of apparatuses as long as the functions of the present invention are implemented, unless otherwise noted. It should also be naturally appreciated that the present invention is applicable to a system in which processing is executed through connection using a network, such as LAN and WAN, as long as the functions of the present invention are implemented, unless otherwise noted.

<Configuration Diagram of System of Present Invention>

In FIG. 1, a host computer 10 includes a CPU 101 that executes processing based on application programs and the like stored in a ROM 103 or in an external memory 108. The CPU 101 also performs overall control of apparatuses connected to a system bus 109. This ROM 103 or external memory 108 also stores, for example, an operating system program (hereinafter OS) which is a control program for the CPU 101. A RAM 102 functions as a main memory, a working area, and the like for the CPU 101. A network I/F 104 is herein connected to a network I/F 120 in a multifunction printer (hereinafter MFP) 11, and executes processing for controlling communication with the MFP 11. Furthermore, the computer 10 is connected to a keyboard 105 and a mouse 107 that serve as input apparatuses, and to a monitor 106 that serves as an output apparatus. The CPU 101 opens various types of registered windows based on commands invoked by, for example, a non-illustrated mouse cursor on the monitor 106, and executes various types of data processing. In order to conduct printing, a user opens a window related to print settings so as to configure settings of the printer, select a print mode, and set a print processing method to a printer driver, including a later-described density fine adjustment function. Furthermore, application of gradation targets of respective object types is realized by execution of a predetermined program by the CPU 101.

The MFP 11 is made up of a controller unit 110, a scanner unit 111, an operation unit 112, an external memory 113, and a printer unit 114. In the controller unit 110, a printer CPU 116 outputs an image signal to the printer unit 114 based on a control program and the like via a printer I/F unit 123 connected to a system bus 119. The control program is stored in a ROM 118 and the external memory 113. The ROM 118 also stores, for example, a control program for the CPU 116. The CPU 116 is configured such that it can execute processing for communication with the computer 10 via the network I/F unit 120 and notify the computer 10 of, for example, information within the printer. A RAM 117 functions as a main memory, a working area, and the like for the CPU 116.

In print processing from the computer 10, image data input using the keyboard 105 and the mouse 107 is transmitted to the controller unit 110 via the network I/F units 104 and 120. Then, a page description language (PDL) data processing unit 121 performs PDL interpretation and rendering, an image processing unit 122 executes image processing for printing output, and the printer unit 114 conducts printing of the processed image data.

In copy processing, the scanner unit 111 reads a document, the image processing unit 122 executes image processing for printer output via a scanner I/F unit 115 and the system bus 119, and the printer unit 114 conducts printing of processed image data.

While the host computer 10 applies the density fine adjustment and gradation targets in the above description, the MFP 11 may apply the density fine adjustment and gradation targets. In the case where the MFP 11 applies the density fine adjustment and gradation targets, the density fine adjustment and gradation target can also be applied with respect to copying or to image data that has been input from another apparatus. In this case, it is necessary to identify a type of an object included in the image data prior to the application of the gradation target.

<Image Processing Unit>

Figure 2:
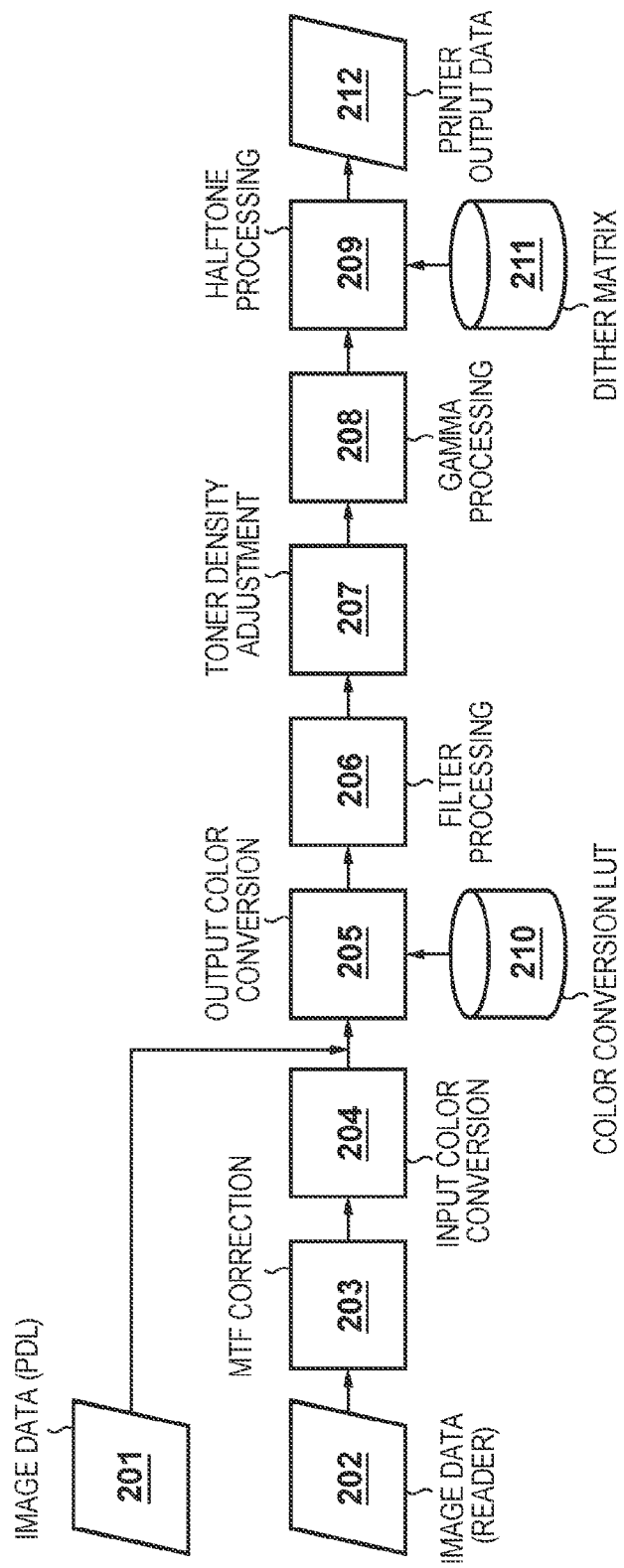
FIG. 2 is a block diagram showing print processing according to one embodiment of the present invention.

FIG. 2 is an explanatory diagram showing a flow in which the image processing unit 122 processes image data for copying and printing. The image processing unit 122 includes blocks unique to operations of copy functions, executes mutual processing at the time of operations of copy functions and PDL print functions, processes image data transmitted from the CPU 116 via the system bus 119, and returns the result of processing to the CPU 116 similarly via the system bus 119.

At the time of copy operations, an MTF correction unit 203 corrects reading frequency characteristics of multi-value image data (here, assumed as 8 bits) 202 that has been read by a reader, such as the scanner unit 111. An input color conversion unit 204 converts a reader-specific color space of the corrected image data to a common RGB color space. In this color space conversion according to the present embodiment, the reader-specific color space is converted to a common colorimetric RGB color space by a 3×3 matrix operation that has been defined in advance.

An output color conversion unit 205 applies an interpolation operation to the image data, to which color space conversion to a common color space has been applied, using a color conversion lookup table (LUT) 210 so as to convert the common RGB color space to a printer color space composed of output color components suited for the printer, such as CMYK. This color conversion LUT 210 is a three-dimensional LUT in which the three components, that is to say, RGB components are divided at an appropriate interval of lattice points, and LUT entries hold CMYK values of 8-bit precision corresponding to lattice points of the LUT. The three-dimensional LUT is converted to image data of CMYK values by performing a known interpolation calculation. That is to say, the output processing conversion unit executes processing for converting luminance data related to RGB and the like to density data of a recording material used to form images, such as toner and ink.

Next, a filter processing unit 206 applies filter processing involving a multiply-accumulate operation to the CMYK image data using a filter coefficient corresponding to user settings. In this way, the output CMYK image data can be sharpened or smoothed. The image data thus obtained serves as image data input to a toner density adjustment unit 207 and subsequent units.

If necessary, the toner density adjustment unit 207 adjusts image data that has been processed in the above-described manner such that the image data has density characteristics corresponding to user settings, and sets the post-adjustment density characteristics of the colors C, M, Y and K as a one-dimensional LUT. This toner density adjustment unit 207 also executes later-described density fine adjustment processing. Subsequently, a gamma processing unit 208 composed of a one-dimensional LUT corrects density characteristics to match gradation targets. In other words, the image data for which the density adjustment has been performed is input for the next conversion. A gradation target refers to target gradation properties of an image; a gradation target mentioned in the present embodiment represents a function and a correction table for correcting an output image signal so as to coordinate an output image signal value with target density at which an image is formed in correspondence with the signal value. In the case where gradation targets of different gradation conversion characteristics (also referred to as gradation characteristics) are applied to different objects such as images, graphics and texts, the correction is performed here by switching to a gradation target corresponding to a present object type. It will be assumed here that both input and output of the LUT have 9-bit precision. The resultant data serves as output image data for which the gradation correction has been performed. Finally, with use of a dither matrix 211, a halftone processing unit 209 converts the gamma-corrected image data to printer output data 212, which is image data reproducing any of the colors C, M, Y and K using 1-bit pseudo-halftone, and transmits the result of processing to a main controller. Here, the halftone processing unit 209 executes processing for comparing a numerical value of the dither matrix 211 stored in the RAM 117 with the input image data, and outputting 1 and 0 respectively if a numerical value of the input image data is large and small. While the present embodiment adopts screen processing of 1-bit output for ease of description, the number of output bits is not limited to 1. Furthermore, the halftone processing 209 can also switch among a plurality of dither matrices 211 for use in accordance with an instruction from the CPU 116. The image processing unit 122 returns the processed printer output data 212 to the CPU 116.

At the time of operations of print functions, the image processing unit 122 receives image data (PDL image data) 201 that has been rasterized by the PDL data processing unit 121 from the CPU 116 via the system bus 119, and processes the same. At the time of operations of PDL functions, the MTF correction 203 and the input color conversion 204, which are arranged for images read by the reader, are not necessary; therefore, processing of these units are bypassed, and processing from the output color conversion 205 is executed. Once the printer output data 212 has been output, it is returned from the image processing unit 122 to the CPU 116, and ultimately transmitted to the printer unit 114.

<Density Adjustment>

The following describes an example of density fine adjustment performed in the toner density adjustment 207 with reference to FIGS. 3A to 3F and FIG. 4. FIGS. 3A to 3F show variations of density characteristics of a certain color before and after density adjustment. While color conversion is normally performed in accordance with linear characteristics indicated by a characteristic curve 301, desired density characteristics can be set for selected colors and density ranges, on a per-color basis and on a per-density range basis, through an instruction made by the user via an adjustment user interface (UI) shown in FIG. 4 using the operation unit 112 and input apparatuses, such as the keyboard 105 and the mouse 107 of the computer 10; as a result, density can be adjusted in accordance with, for example, the density characteristics shown in FIGS. 3A to 3F.

Figure 4:
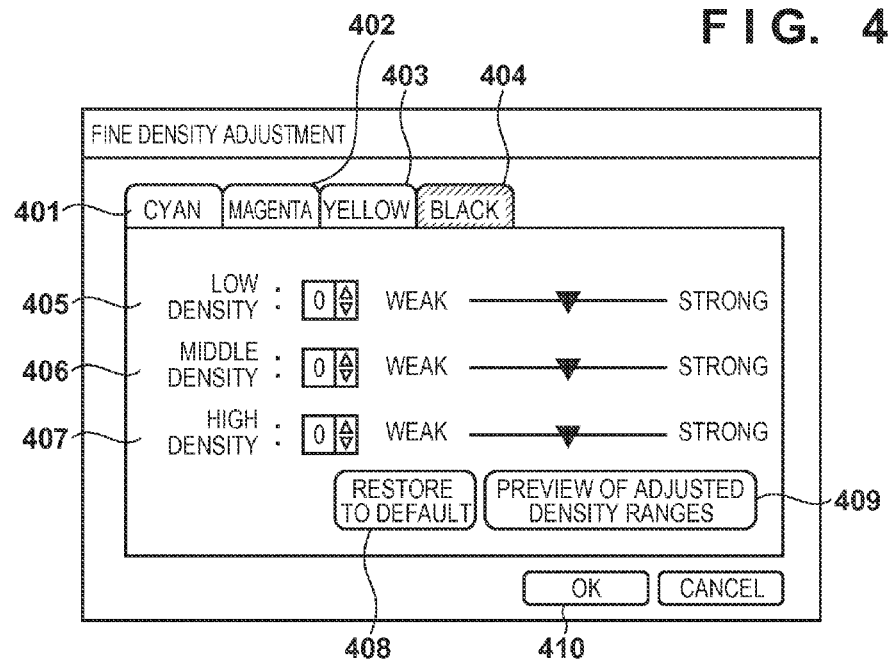
FIG. 4 shows a UI of the density adjustment function.

FIG. 4 shows an example of an adjustment UI displayed by the monitor 106 and the operation unit 112. An adjustment screen includes discrete tabs 401, 402, 403 and 404 for cyan (C), magenta (M), yellow (Y) and black (K), respectively. In the case of a monochrome apparatus, only K is needed. In the present example, an adjustment screen related to K is displayed, and with respect to density ranges of low density 405, middle density 406 and high density 407, an appropriate adjustment level is selected from among several adjustment degrees between "Weak" and "Strong" using an output density adjustment bar. The adjusted level, which reflects the extent of adjustment, is 0 if no adjustment is made (that is to say, in the case of linear characteristics), has a positive value in the case of a concave curve, and has a negative value in the case of a convex curve.

In FIGS. 3A to 3F, an axis representing an input density signal value is divided into three regions, that is to say, low-, middle- and high-density ranges. In the present example, an input/output density signal value is expressed using 8 bits, and the divided regions overlap, that is to say, the low-density range is 0 to 100, the middle-density range is 80 to 180, and the high-density range is 160 to 255, for the purpose of preventing discontinuity of gradations when synthesizing independently-set adjustment amounts. It should be noted that the number of divided regions and the ranges of density ranges are not limited to the ones shown in FIGS. 3A to 3F; the number of divided regions may be any number other than three, and a definition of the ranges of density ranges may be changed. The invention according to the present embodiment is still applicable in such cases.

Figure 3A:
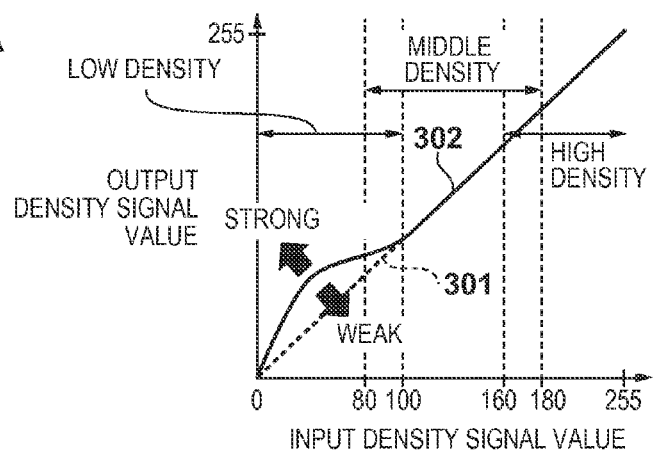
FIGS. 3A to 3F show output density characteristics obtained after adjustment by a density adjustment function according to one embodiment of the present invention.
Figure 3B:
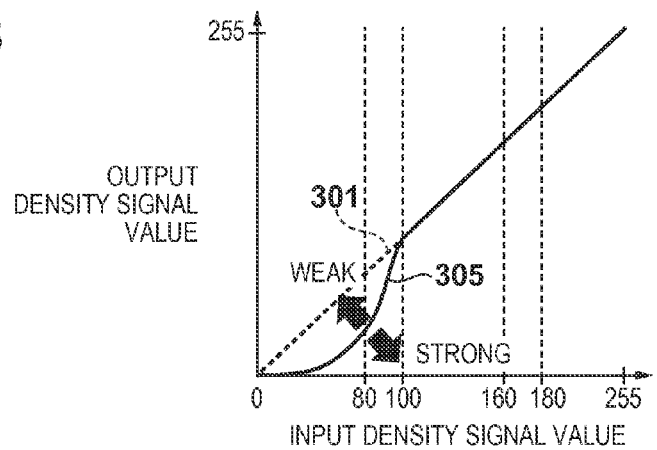
Figure 3C:
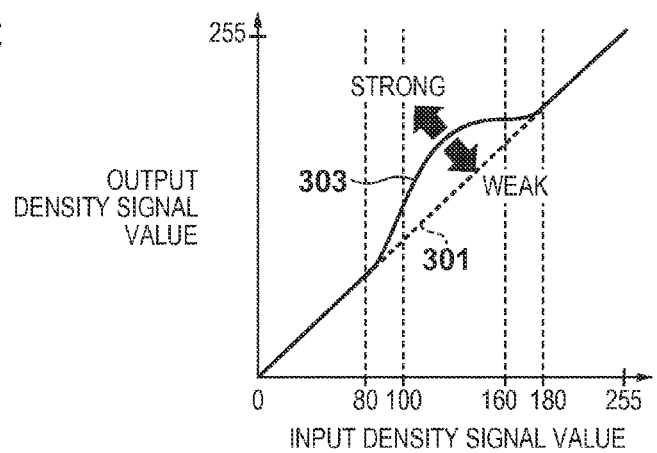
Figure 3D:
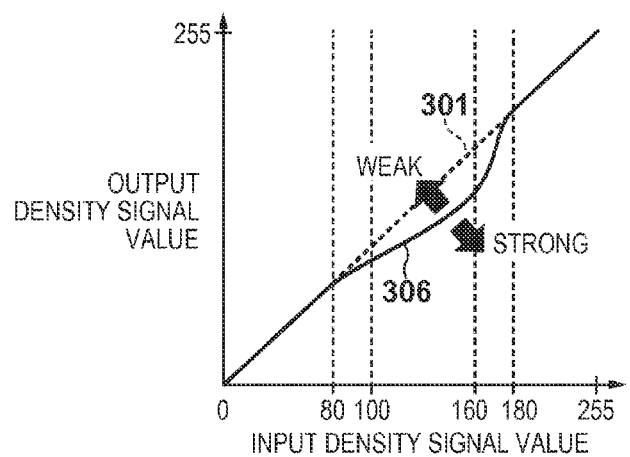
Figure 3E:
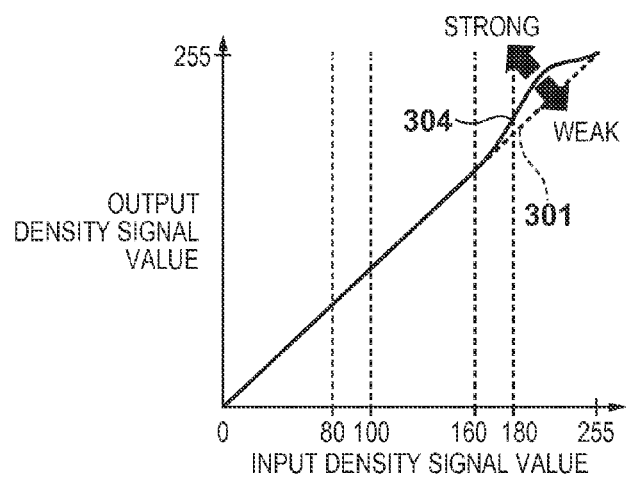
Figure 3F:
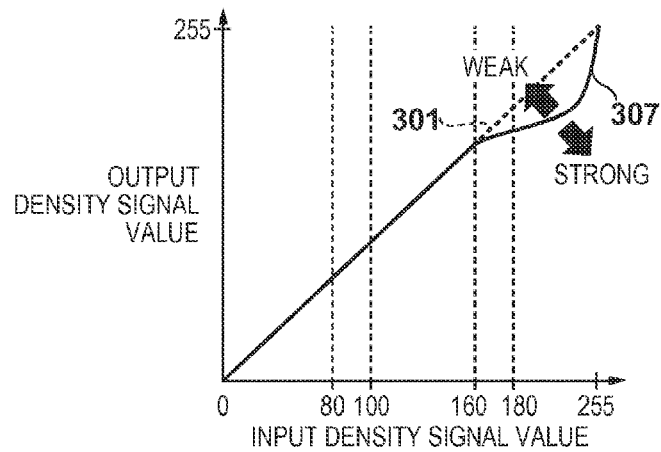

FIG. 3A shows density characteristics 302 for the case where an output density adjustment bar 405 for the low-density range has been adjusted in a direction toward "Strong", and FIG. 3B shows density characteristics 305 for the case where the same bar has been adjusted in a direction toward "Weak". Similarly, FIG. 3C shows density characteristics 303 for the case where an output density adjustment bar 406 for the middle-density range has been adjusted in a direction toward "Strong", and FIG. 3D shows density characteristics 304 for the case where the same bar has been adjusted in a direction toward "Weak". Also, FIG. 3E shows density characteristics 307 for the case where an output density adjustment bar 407 for the high-density range has been adjusted in a direction toward "Strong", and FIG. 3F shows density characteristics 307 for the case where the same bar has been adjusted in a direction toward "Weak". Such adjustment is performed for C, M, Y and K on a per-color basis, and density characteristics obtained as a result of the adjustment are applied to an image to be output in the toner density adjustment 207. Furthermore, for example, eight adjustment degrees are set both in the direction toward "Strong" and in the direction toward "Weak", and an adjustment level is set to one of these adjustment degrees. The higher the adjustment level is, the larger the adjustment curve becomes, that is to say, the larger the adjustment amount becomes; on the other hand, the more the adjustment level approaches 0, the more linear the density characteristics become. A "Restore to Default" button 408 is pressed when restoring the output density adjustment bars 405, 406 and 407 to a default state. When the button 408 is pressed, the density characteristics of all density ranges are restored to preset characteristics.

<Main Processing>

Features of the present invention will now be described with reference to FIGS. 7 and 9. Specifically, the following describes exemplary processing through which the user performs density fine adjustment using the input/output apparatuses connected to the computer 10. That is to say, while the following description pertains to the case where the computer 10 executes processing shown in FIG. 9, the same goes for the case where the density fine adjustment is performed using the operation unit 112 of the MFP 11, that is to say, the case where the MFP 11 executes the processing. In the following description, for the sake of simplicity, it is assumed that a monochrome apparatus is used and the density fine adjustment is performed only for K. In the case of a full-color apparatus, similar density fine adjustment processing is executed on a per-color component basis.

In step S901, image data for which the user has issued an output instruction is input to the computer 10 via an application and a printer driver. This input image data is, for example, application data of image editing software and office document editing software. For example, the output instruction is input from a user interface of an application program, and a predetermined user interface (driver setting screen) provided by the printer driver is displayed in accordance with this input. A density fine adjustment button and a print instruction button are arranged on the driver setting screen, and the user clicks the density fine adjustment button and the print instruction button if he/she wishes to perform the density fine adjustment and directly conduct printing, respectively.

In step S902, the computer 10 determines whether or not the user has pressed the "density fine adjustment" button on the driver setting screen at the time of printing. Step S903 follows if the density fine adjustment button has been pressed, and step S907 follows if the print instruction has been directly input without pressing of the density fine adjustment button.

Figure 7:
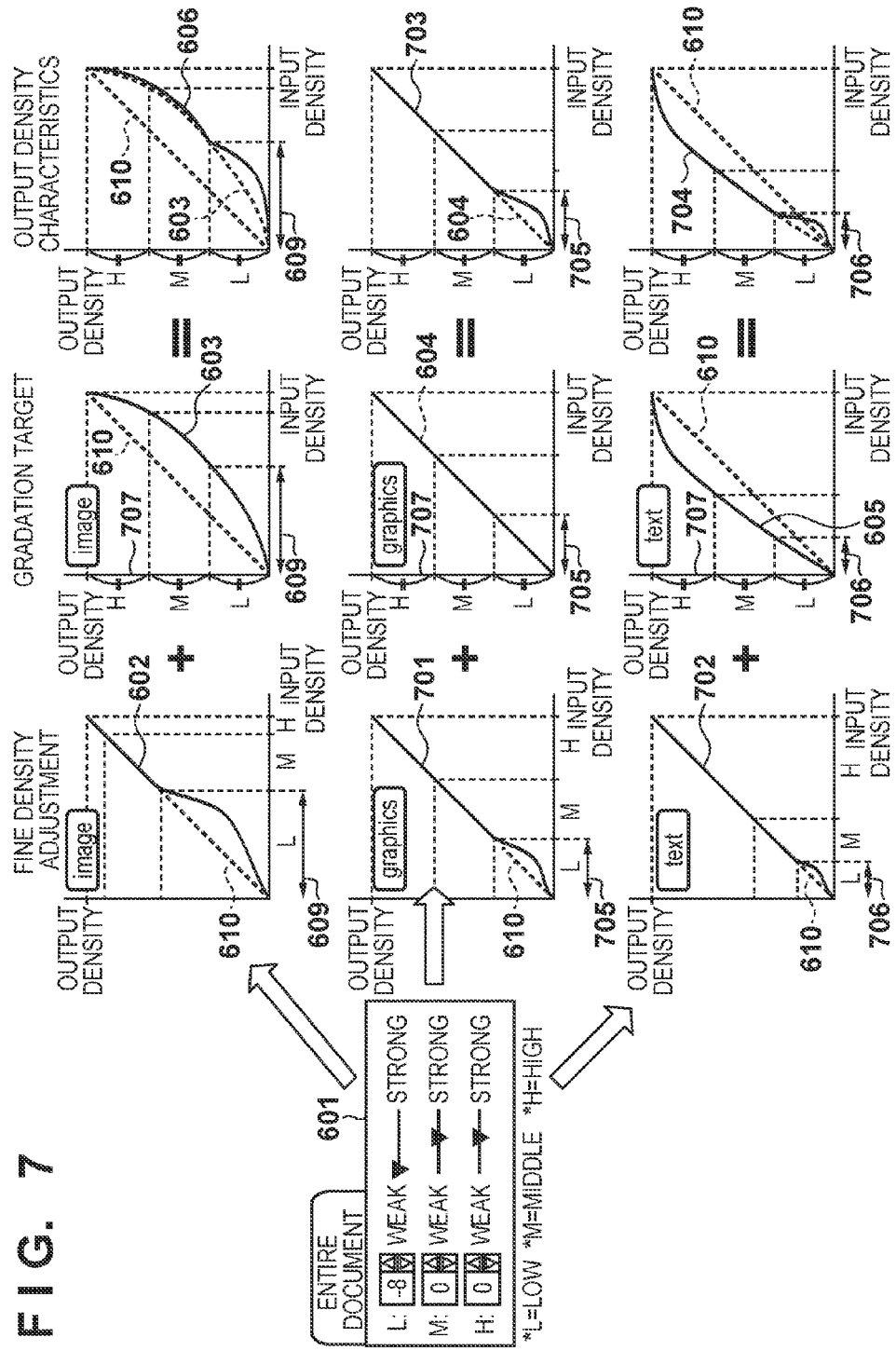
FIG. 7 shows examples of differences in adjusted density ranges that are used by the density adjustment function implemented in the present invention.

In step S903, a density fine adjustment UI, such as the one shown in FIG. 4 and a UI 601 shown in FIG. 7, is displayed, and the user inputs an instruction related to a density adjustment level using the displayed UI. As one example, it will be assumed here that −8 is set as an adjustment level for the low-density range as indicated by the UI 601. Subsequently, step S904 follows.

In step S904, adjustment tables are generated in one-to-one correspondence with objects, and the generated adjustment tables are stored in the RAM 102 of the computer 10 or in the external memory 108. In the present example, adjustment tables for images, graphics and texts include density characteristics 602, 701 and 702, respectively. That is to say, with respect to output signal values to which the gradation targets have been applied, adjustment tables are generated in which the originally-defined density ranges reflect the density fine adjustment. Specifics of this process will be described later. Subsequently, step S905 follows.

In step S905, if the user determines to end the adjustment, the adjustment processing is ended upon pressing of an "OK" button 410 on the UI shown in FIG. 4, and step S906 follows if the print instruction is further input. In step S906, a print image process is executed in accordance with the flow described with reference to FIG. 2 by switching to one of the adjustment tables, which have been generated in one-to-one correspondence with objects in step S904, a gradation target, a gamma correction table, and a dither process corresponding to a present object. Subsequently, in step S907, the printer conducts printing output, which marks the end of the whole processing.

<Generation of Adjustment Tables>

Figure 8:
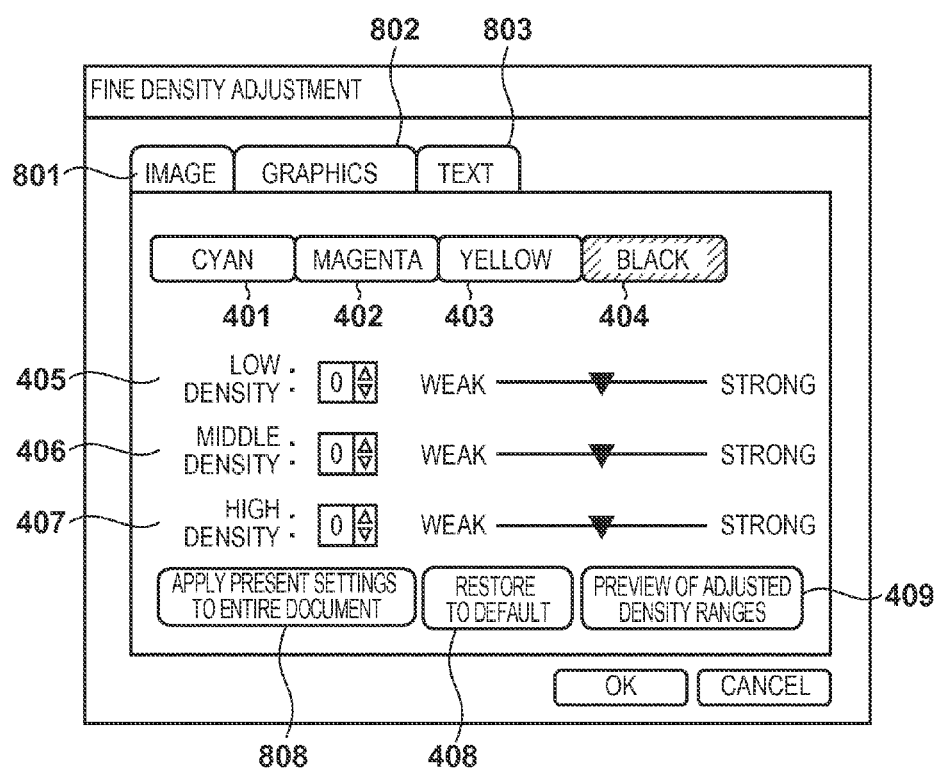
FIG. 8 shows a second example of a UI of the density adjustment function.

A description is now given of generation of the adjustment tables in step S904 with reference to FIGS. 7, 8 and 10. In step S1001, an output density range of gradation targets is divided such that density ranges of the final output density characteristics, which are independently targeted for the adjustment, are uniform irrespective of the gradation targets (that is to say, for all object types). As one example, it will be assumed here that the output density range is trisected as indicated by density ranges 707. Here, it is important that the ranges of density ranges that have been adjusted by the density fine adjustment function are uniform across all objects after the printing output, and the output density range may be divided at other ratios instead of being trisected. The ranges of density ranges thus determined are expressed by the minimum and maximum values of the ranges, and these values are stored. The minimum and maximum values of the ranges are collectively referred to as boundary values. It should be noted that density ranges may overlap as has been stated earlier, and the boundary values may not necessarily represent boundaries of the density ranges contrary to the name.

Subsequently, in step S1002, whether or not to set the adjustment values that have been set using the adjustment UI mutually for an entire image, that is to say, all object types, is determined. FIG. 8 shows an example of a UI that allows for selection of whether or not to set the same adjustment values for all object types. In FIG. 8, an image adjustment tab 801, a graphics adjustment tab 802, and a text adjustment tab 803 are displayed, and adjustment values can be set on a per-color basis on any tab. It is permissible to apply settings for a certain object to all object types by pressing an "Apply Present Settings to Entire Document" button 808, if desired. Step S1012 follows if mutual adjustment values are to be set for all object types, and steps S1003, S1006 and S1009 follow if adjustment values are to be set individually on a per-object type basis. Thereafter, processing is executed on a per-object type basis, that is to say, steps S1003 to S1005 are executed with respect to images, steps S1006 to S1008 are executed with respect to graphics, and steps S1009 to S1011 are executed with respect to texts. On the other hand, if mutual adjustment values are to be used, steps S1012 to S1014 are executed. In any case, the substance of processing is the same. The following describes processing with respect to images as one example.

In step S1003, boundary values of density ranges for input density of the gradation target are calculated by reverse-calculating boundary values of density ranges for output density of the gradation target using the gradation target 603 for images. More specifically, boundary values of density ranges for input density of the gradation target can be obtained by converting the boundary values of density ranges determined in step S1001 using reverse characteristics of density characteristics defined by the gradation target 603, that is to say, by reverse-converting the same. The boundary values calculated at step S1003 (and also at S1006, S1009) may be referred to as boundary input signal values, hereinafter. It will be assumed that the gradation target 604 and the gradation target 605 are preset for graphics and texts, respectively. Based on the calculated boundary values of low-density ranges for input density of the gradation targets, low-density ranges 609, 705 and 706 are determined for images, graphics and texts, respectively. If the button 808 is pressed, that is to say, if mutual adjustment values are to be set for all objects, step S1012 follows, and boundaries of density ranges in input density are determined using the gradation target of an object of a UI tab on which the "Apply Present Settings to Entire Document" button 808 was pressed in step S1002. That is to say, the process of one of steps S1003, S1006 and S1009 is executed in accordance with an object type being selected.

In step S1004, a density adjustment curve (density characteristics) is generated that brings density values of the density ranges calculated in step S1003, e.g., the low-density range, into conformity to the adjustment levels. The boundary values for input density obtained in step S1003 directly serve as boundary values of density ranges in the adjustment table used in the density fine adjustment. Preset values of the density fine adjustment are not associated with any adjustment, that is to say, they satisfy the relationship output=input; therefore, input density ranges are equal to output density ranges in the adjustment table. In view of this, one conceivable method to generate a density adjustment curve is to, for example, give an adjustment point of one or more to unadjusted characteristics (output=input) serving as the basis, and perform spline interpolation, Bezier interpolation, linear interpolation, and the like in density ranges to be adjusted; alternatively, other methods may be used. Subsequently, step S1005 follows. If mutual adjustment values are to be set, a density adjustment curve is generated in step S1013 by executing one of steps S1004, S1007 and S1010 in accordance with an object type being selected. The density adjustment curve thus generated is applied to all object types.

In the case where the preset density fine adjustment is associated with some sort of conversion instead of being associated with no conversion, boundary values of a conversion result obtained using reverse conversion of the gradation target are converted to boundary values for the input density using reverse conversion of the adjustment table for the density fine adjustment. The obtained boundary values indicate ranges of density ranges in input density of the adjustment table, that is to say, density ranges targeted for the density fine adjustment.

In step S1005, the finished density characteristics 602 are stored into the RAM 102 of the computer 10 or into the external memory 108 as an adjustment table for images, and processing is ended. As the density values are discrete, for example, an output value is obtained by applying an input integer value to a density adjustment curve obtained by interpolation, the output value is rounded to an integer, and the output value is associated with the input value in an adjustment table; the resultant adjustment table is used as a density conversion table. The density conversion table is stored into a memory. The density characteristics 701 and the density characteristics 702 are obtained for graphics and texts, respectively. If mutual adjustment values are to be set, in step S1014, one of steps S1005, S1008 and S1011 is executed in accordance with an object type being selected, and a mutual adjustment table, that is to say, a mutual density conversion table is generated and stored for all object types.

In the example described above, boundary values of density ranges for input density of gradation targets of respective objects are calculated each time the density fine adjustment processing is executed, as in steps S1001, S1003, S1006, S1009 and S1012; alternatively, they may be calculated in advance. In the example described above, adjustment tables are calculated each time the density fine adjustment processing is executed; alternatively, it is permissible to store in advance adjustment tables including sets of items that can be adjusted by the user into a memory, such as the external memory 108, and execute processing by reading out the adjustment tables when adjustment values have been set.

The above-described processing makes it possible to obtain output density characteristics on a per-object type basis, that is to say, output density characteristics 606 for images, output density characteristics 703 for graphics, and output density characteristics 704 for texts representing a synthesis of the density fine adjustment and gradation target, and consequently, low-density ranges of respective objects can be adjusted to be light. In the present embodiment, as shown in FIG. 2, the density fine adjustment and the gradation target are applied by the toner density adjustment unit 207 and the gamma processing unit 208, respectively, and therefore conversion tables are separately prepared and applied. However, the density fine adjustment and gradation target can be collectively applied by generating a post-synthesis conversion table and applying the generated conversion table to the object types.

By applying the present invention in the above-described manner, density ranges are brought into conformity to adjusted density ranges visually irrespective of differences in objects, thereby allowing for intuitive density adjustment. While the density fine adjustment is performed with respect to print processing from the computer 10 in the description of the present embodiment, the method of the present embodiment may be applied to the MFP 11.

In the case where it is not possible to perform the density fine adjustment on a per-object type basis, that is to say, in the case where only mutual adjustment can be performed for all object types, adjustment tables are generated in one-to-one correspondence with object types and the density fine adjustment is performed on a per-object type basis using the generated adjustment tables as shown in FIG. 7. Even under the presence of a function of performing the density fine adjustment on a per-object type basis, it is permissible to prepare an option whereby adjustment tables are generated in one-to-one correspondence with the object types and the density fine adjustment is performed on a per-object type basis using the generated adjustment tables.

Regarding the order of application of a gradation target and application of the density fine adjustment, contrary to the order shown in FIG. 2, the gamma processing unit 208 may precede the toner density adjustment unit 207. It is also permissible to synthesize a conversion LUT from the gamma processing unit 208 and an adjustment LUT from the toner density adjustment unit 207 and apply the synthesized LUT at one time. In this case also, the method for determining density ranges to be adjusted described in the present embodiment can be applied.

Second Embodiment

Preview of Adjusted Density Ranges

While the first embodiment has described a method that allows for density adjustment irrespective of differences in objects, the following describes a method for displaying a preview of adjusted density ranges such that the user can perform more intuitive adjustment with reference to FIGS. 4, 5, 11 and 12.

<Main Processing>

The user designates an output image in step S1101, and whether or not to perform density fine adjustment is determined in step S1102. As the processes of these steps S1101 and S1102 are similar to those of steps S901 and S902 described earlier, a description thereof is omitted.

In step S1103, if a "Preview of Adjusted Density Ranges" button 409 is pressed on the UI shown in FIG. 4, step S1104 follows. If it is not pressed, step S1105 follows. In step S1104, an image of the preview of adjusted density ranges is displayed by the monitor 106. Specifics of this process will be described later. In step S1105, the user issues an instruction related to an adjustment level while viewing the preview of adjusted density ranges. The processes of subsequent steps S1105 to S1109 are similar to those of steps S903 to S907 of the first embodiment, and therefore a description thereof is omitted.

While the preview is displayed prior to generation of the adjustment tables in the example of FIG. 11, pressing of the "Preview of Adjusted Density Ranges" button 409 on the screen shown in FIG. 8 may serve as a trigger to call up step S1104. Alternatively, in determining whether or not a print instruction has been issued immediately after step S1106 in FIG. 11, steps S1108 and S1103 may follow respectively if the print instruction has been issued and if the print instruction has not been issued. In this case, if the "Preview of Adjusted Density Ranges" button 409 is pressed after performing the density adjustment by operating the adjustment bars, adjustment tables corresponding to density ranges, object types and amounts to be adjusted are generated. Then, steps S1203 and S1204 of FIG. 12 are executed in accordance with boundary values of density ranges used in the adjustment tables of respective objects at that time.

<Display of Preview of Adjusted Density Ranges>

Figure 5:
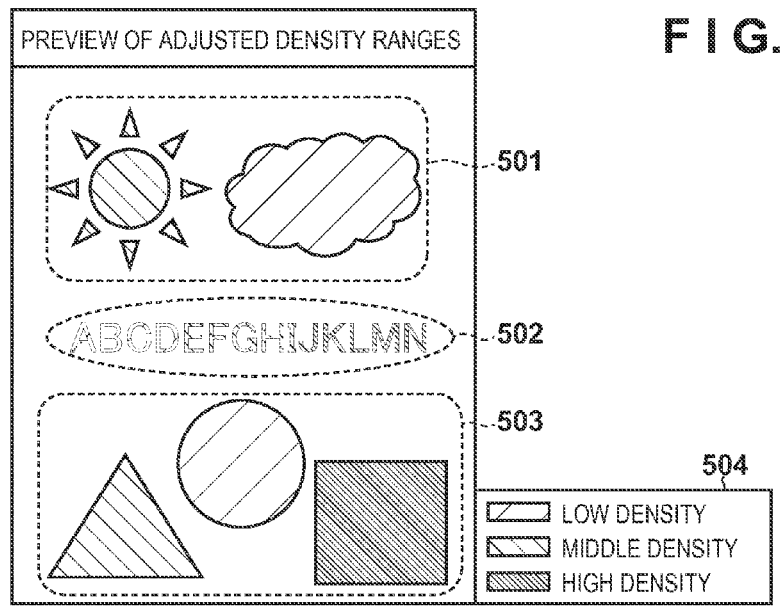
FIG. 5 shows an example of a screen showing a preview of adjusted density ranges, which is used in density adjustment in the present invention.
Figure 6:
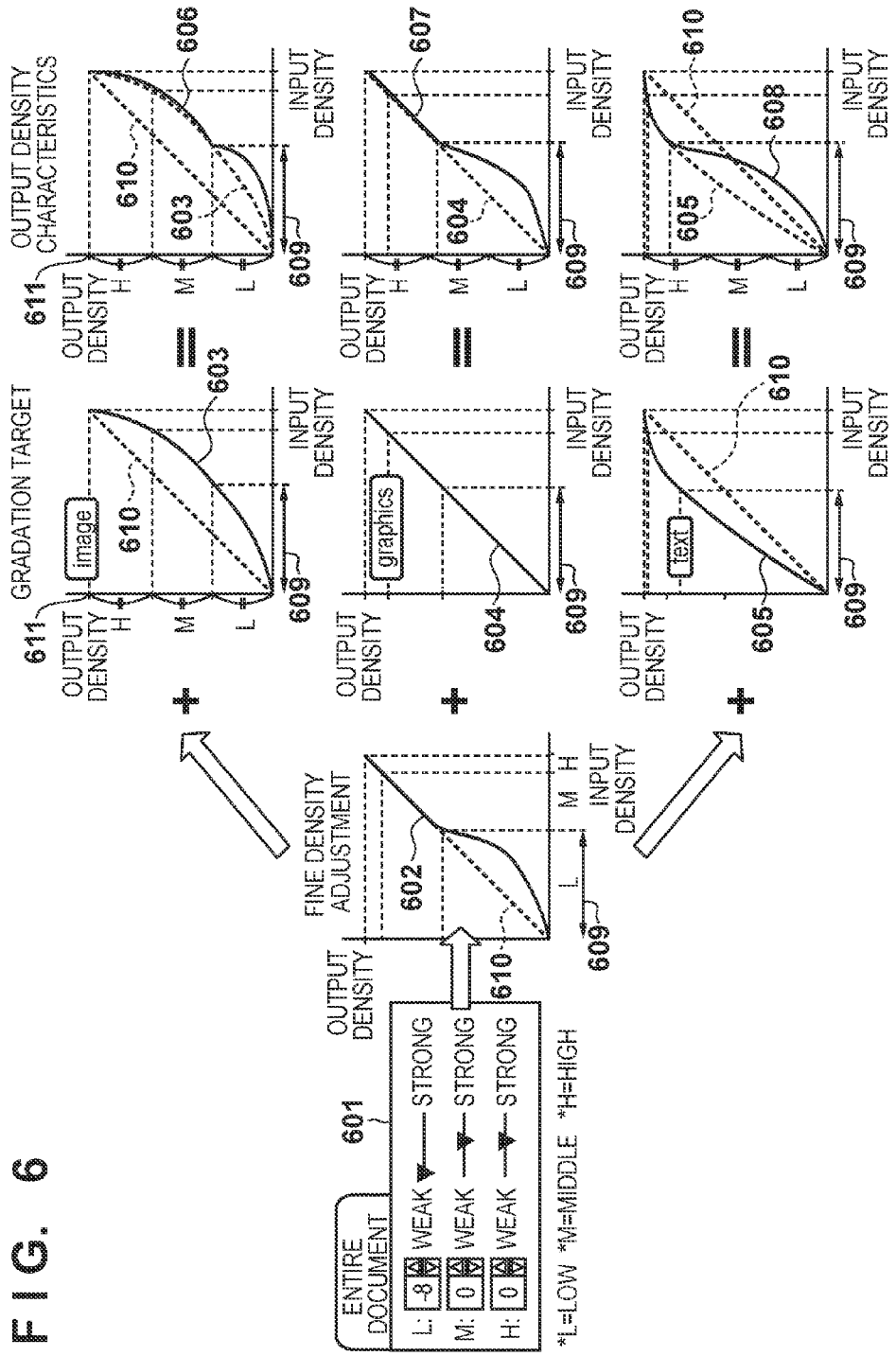
FIG. 6 shows examples of output density characteristics obtained by synthesizing a density range adjustment function and gradation targets.

A description is now given of display of the preview of adjusted density ranges in step S1106 with reference to FIGS. 5 and 12. In step S1201, in order to increase the speed of a preview display process, a thumbnail image is generated by lowering a resolution of image data to be printed. Subsequently, in step S1202, the process of the toner density adjustment 207 and the processes therebefore are applied to objects in data of the thumbnail image. In step S1203, low-, middle- and high-density range flags are set for thumbnail pixels, on a pixel-by-pixel basis, by comparing pixel values of pixels in the thumbnail image with boundary input signal values of density ranges to be adjusted for the objects, and determining the density ranges in which the pixels are included. The results of performing reverse calculation for the gradation targets of the respective objects, as in steps S1003, S1006 and S1010 described earlier, are used as the boundary input signal values of the density ranges to be adjusted. In step S1204, based on the low-, middle- and high-density range flags for the thumbnail image, a preview image showing the adjusted density ranges is displayed by the monitor 106 in such a manner that the density ranges in which the pixels are included are identifiable on an individual basis in accordance with, for example, a rendering method for recording pixels using different colors such as red, blue and green, different patterns, or different densities.

FIG. 5 shows an exemplary image of a preview of adjusted density ranges. This image data includes a mixture of images 501, texts 502 and graphics 503. They are obtained by calculating correspondence relationships between input signal values and density ranges in consideration of the gradation targets of the respective objects. Corresponding density ranges are identifiable due to the use of different colors shown in a sample 504, and the user can perform the adjustment with appropriate judgment of density ranges corresponding to portions that he/she wishes to adjust while viewing it.

While the UI is displayed by the monitor 106 connected to the computer 10 in the present embodiment, the UI may be displayed by the operation unit 112 of the MFP 11 to seek an instruction from the user.

Through the above-described processing, a preview of objects in image data to be adjusted is displayed in such a manner that density ranges to be adjusted are identifiable on an individual basis. In this way, the user can be assisted in performing the density adjustment intuitively.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126123, filed Jun. 14, 2013 which is hereby incorporated by reference herein in its entirety.

What is claimed is:

1. An image processing apparatus that obtains output image data by processing input image data, comprising:
   a density adjustment level input unit capable of inputting an adjustment level for adjusting density in a designated output density range of a plurality of predetermined density ranges in the output image data;
   a density adjustment unit that adjusts density of the input image data according to the input adjustment level,
   a gradation conversion unit that applies gradation conversion of different gradation characteristics for different object types included in the input image data to generate the output image data;
   a calculation unit that calculates an input density range in the input image data corresponding to the designated output density range by converting the designated output density ranges using a reverse conversion of the gradation conversion for a designated type of object, the reverse conversion being a conversion for obtaining the input image data from the output image data generated by applying the gradation conversion to the input image data; and
   a generation unit that generates an adjustment table in correspondence with each object type so that density in the input density range calculated by the calculation unit are adjusted using the adjustment table according to the adjustment level input by the density adjustment level input unit, wherein
   the density adjustment unit adjusts density of the input image data using the adjustment table generated by the generation unit, and the gradation conversion unit derives the output image data by applying gradation conversion to the image data whose density has been adjusted by the density adjustment unit.

2. The image processing apparatus according to claim 1, wherein
   the density adjustment level input unit is further capable of inputting the adjustment level of each of a plurality of output color components independently,
   the calculation unit further calculates the input density ranges on respective color components, and
   the generation unit further generates the adjustment tables in one-to-one correspondence with the color components.

3. The image processing apparatus according to claim 1, wherein
   the density adjustment level input unit is further capable of inputting the adjustment level for a selected object type targeted for density adjustment,
   the calculation unit calculates the input density ranges in the input image data selected for the object type, and
   in a case where density adjustment for the selected object type is applied to an entire image, the generation unit generates the adjustment tables in one-to-one correspondence with the input density ranges calculated for the selected object type, the adjustment tables targeting all object types and all output color components and corresponding to the adjustment level for the respective output density ranges.

4. The image processing apparatus according to claim 1, further comprising:
   a determination unit that determines, based on the output density ranges of the respective object type, which density ranges each pixels in each object in the input image data correspond to; and
   a preview display unit that displays a preview image of the input image data on a screen in such a manner that the density ranges determined by the determination unit are identifiable on an individual basis.

5. The image processing apparatus according to claim 4, wherein
   the preview display unit displays the image data using different colors, patterns or densities for different density ranges.

6. The image processing apparatus according to claim 1, further comprising
   a user interface unit that displays a user interface for setting the adjustment level on a per-density range basis.

7. The image processing apparatus according to claim 1, further comprising
   an image forming unit that forms an image based on the output image data.

8. The image processing apparatus according to claim 7, wherein
   the input image data is image data obtained by converting PDL image data or luminance data read by a scanner to density data for a recording material used by the image forming unit.

9. An image processing method performed by an image processing apparatus that obtains output image data by processing input image data, the image processing method comprising:
   a density adjustment level input step of inputting an adjustment level for adjusting density in a designated output density range of a plurality of predetermined density ranges in the output image data;
   a density adjustment step of adjusting density of the input image data according to the input adjustment level,
   a gradation conversion step of applying gradation conversion of different gradation characteristics for different object types included in the input image data to generate the output image data;
   a calculation step of calculating an input density ranges in the input image data corresponding to the designated output density range by converting the designated output density ranges using a reverse conversion of the gradation conversion for a designated type of object, the reverse conversion being a conversion for obtaining the input image data from the output image data generated by applying the gradation conversion to the input image data; and
   a generation step of generating an adjustment table in correspondence with each object type so that density in the input density range calculated by the calculation unit are adjusted using the adjustment table according to the adjustment level input by the density adjustment level input unit; and, wherein
   the density adjustment step adjusts density of the input image data using the adjustment tables generated in the generation step, and the gradation conversion step derives the output image data by applying gradation conversion to the image data whose density has been adjusted in the density adjustment step.

10. A non-transitory computer-readable medium storing a program for causing a computer to perform an image processing method for obtaining output image data by processing input image data, the image processing method comprising:
- a density adjustment level input step of inputting an adjustment level for adjusting density in a designated output density range of a plurality of predetermined density ranges in the output image data;
- a density adjustment step of adjusting density of the input image data according to the input adjustment level,
- a gradation conversion step of applying gradation conversion of different gradation characteristics for different object types included in the input image data to generate the output image data;
- a calculation step of calculating an input density ranges in the input image data corresponding to the designated output density range by converting the designated output density ranges using a reverse conversion of the gradation conversion for a designated type of object, the reverse conversion being a conversion for obtaining the input image data from the output image data generated by applying the gradation conversion to the input image data; and
- a generation step of generating an adjustment table in correspondence with each object type so that density in the input density range calculated by the calculation unit are adjusted using the adjustment table according to the adjustment level input by the density adjustment level input unit; and, wherein
- the density adjustment step adjusts density of the input image data using the adjustment tables generated in the generation step, and the gradation conversion step derives the output image data by applying gradation conversion to the image data whose density has been adjusted in the density adjustment step.

11. An image processing apparatus, comprising:
- an adjustment unit that generates an adjustment table representing a density characteristic for adjusting an output density corresponding to an input density within each of a plurality of input density ranges independently of other input density ranges for each type of objects included in input image data, wherein an input density range is determined by converting a predetermined output density range which is common to different types of objects according to reverse characteristic of a gradation characteristic for a type of object;
- a correction unit that corrects densities of the input image data using respective gradation characteristics for different types of objects and the density characteristic represented by the adjustment table for each type of object,
- wherein a low density range of the plurality of input density ranges for a specific type of object is narrower than that of another type of object, the specific type of object having a gradation characteristic that a ratio of the predetermined output density range to the input range in the low density range is larger than the ratio for the other type of object, and
- wherein a correction performed by the correction unit includes a correction of the densities of an image of a type of object by converting the densities of the image to be corrected into densities mapped by the adjustment table for the type of object, and
- when an image to be corrected corresponds to the specific type of object, the correction unit corrects the image using the adjustment table generated for the specific type of object.

12. The apparatus according to claim 11, wherein the types of objects include an image type, graphic type and/or text type, and the specific type of object is the text type.

13. The image processing apparatus according to claim 11, wherein the adjustment unit generates the adjustment table representing the density characteristic in which output densities corresponding to boundary points of the input density range are left unchanged.

* * * * *